United States Patent
Eversull

[15] 3,659,265
[45] Apr. 25, 1972

[54] ANTI-THEFT DETECTOR AND ALARM SYSTEMS FOR VEHICLES

[72] Inventor: Richard F. Eversull, 5009 Ogallala Place, Cheyenne, Wyo. 82001

[22] Filed: May 27, 1970

[21] Appl. No.: 41,020

[52] U.S. Cl. ............................................340/65, 200/61.52
[51] Int. Cl. .......................................................B60r 25/10
[58] Field of Search ...........................340/52 H, 63, 64, 65; 200/61.45, 61.52; 307/10

[56] References Cited

UNITED STATES PATENTS 2,947,830   8/1960   Goss ..................................340/65 X

FOREIGN PATENTS OR APPLICATIONS 118,017   1/1944   Australia ..............................340/65

Primary Examiner—Alvin H. Waring
Attorney—Reilly and Lewis

[57] ABSTRACT

Alarm apparatus for use on motor vehicles includes a detector having a self-leveling mount and a relatively heavy, generally spherical contact member which is adjustably suspended from a cable and normally spaced within an outer concentric contact member so that when the suspended contact member moves to and fro in a pendulum action, in response to unauthorized vehicle movement, it will make contact with the outer contact member. An alarm system for the detector is activated by the contact members interconnected so as to regulate the actuation of an alarm element. One alarm system carried by the vehicle applies the vehicle battery power to the vehicle horn, and in the event the vehicle battery fails power from an auxiliary battery is used to actuate a secondary alarm element. Another alarm system is a remote location from the vehicle, such as, in the home may be cable-connected to the detector to give an audible signal in the home when the vehicle is moved.

6 Claims, 7 Drawing Figures

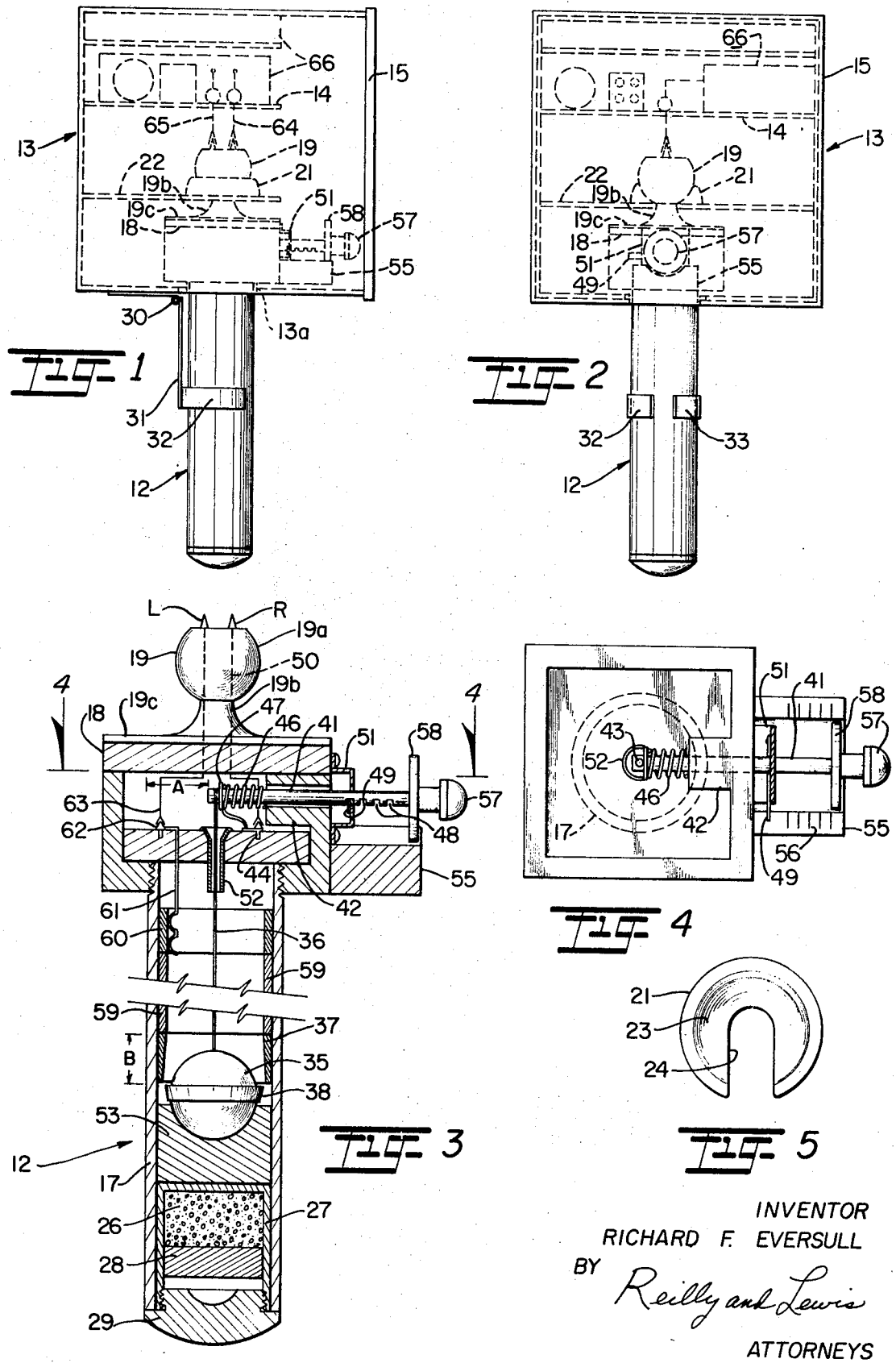

ANTI-THEFT DETECTOR AND ALARM SYSTEMS FOR VEHICLES

This invention in general relates to alarm apparatus and more particularly to novel and improved anti-theft detector and alarm systems utilizing the detector which respond to unauthorized movement of a motor vehicle or a like movable object.

A variety of anti-theft systems have heretofore been provided to protect against unauthorized use of a motor vehicle. In many instances such devices have been responsive to the unauthorized use of an electrical load on the vehicle, such as, the starter, a light, or the like. In other instances the alarm detectors have been responsive either to tilting or other movement of the vehicle.

Accordingly, it is an object of this invention to provide a novel and improved anti-theft detector which is readily attachable to a motor vehicle and is so constructed and arranged as to be highly sensitive to unauthorized movement of the vehicle or any portion thereof.

Another object of this invention is to provide a highly sensitive and reliable detector for use on motor vehicles utilizing pendulum principles to interrupt and complete an alarm circuit.

Yet another object of this invention is to provide an improved movement-responsive detector including a self-leveling mount and where the detector may be set to different degrees of sensitivity, as required.

A further object of this invention is to provide novel and improved alarm systems which are readily adapted for use in association with conventional motor vehicles.

A further object of this invention is to provide novel and improved alarm systems locatable in the vehicle or at a remote location from the vehicle which are responsive to the momentary contact of a pair of contact members.

Yet a further object of this invention is to provide novel and improved alarm apparatus for a motor vehicle including movement-responsive detector on the vehicle and a primary alarm circuit responsive to the detector to actuate an alarm element on the vehicle and a secondary alarm circuit responsive to a failure of the primary alarm circuit to activate yet a second alarm element on the vehicle.

In accordance with the present invention there has been devised a detector including a self-leveling elongated housing in which a contact member is suspended for free swinging movement in normally spaced relation to an outer concentric contact member. The contact members are connected to external terminals which in turn are connected to an alarm circuit system for selective actuation of an alarm element. Preferably, suspended contact member is in the form of a weighted, conductive ball suspended from a cable within a housing, and the outer contact member is in the form of a ring disposed in the wall of the housing, contact being made between the two members when the ball swings from the vertical under the forces of gravity when the vehicle or any portion thereof is moved. An alarm system on the vehicle may employ the vehicle battery and horn to produce an audible sound and also may include a secondary circuit powered by an auxiliary battery operable to actuate an audio generator and a radio broadcast receiver. In the alternative, a remote alarm system in the home is cable-connected to the detector to produce an alarm signal remote from the vehicle.

Other objects, advantages and capabilities of the present invention will become more apparent as the description proceeds taken in conjunction with the accompanying drawings, in which:

FIG. 1 is a side elevation view of the detector and a detector and alarm circuit housing adapted to mount on a vehicle.

FIG. 2 is a front elevation view of the detector and housing shown in FIG. 1.

FIG. 3 is an enlarged vertical sectional view through the detector shown in FIG. 1.

FIG. 4 is a top plan view taken along lines 4—4 of FIG. 3 looking down into the intermediate housing.

FIG. 5 is an enlarged top plan view of the mounting base for the detector shown in FIGS. 1-4.

Figure 6:
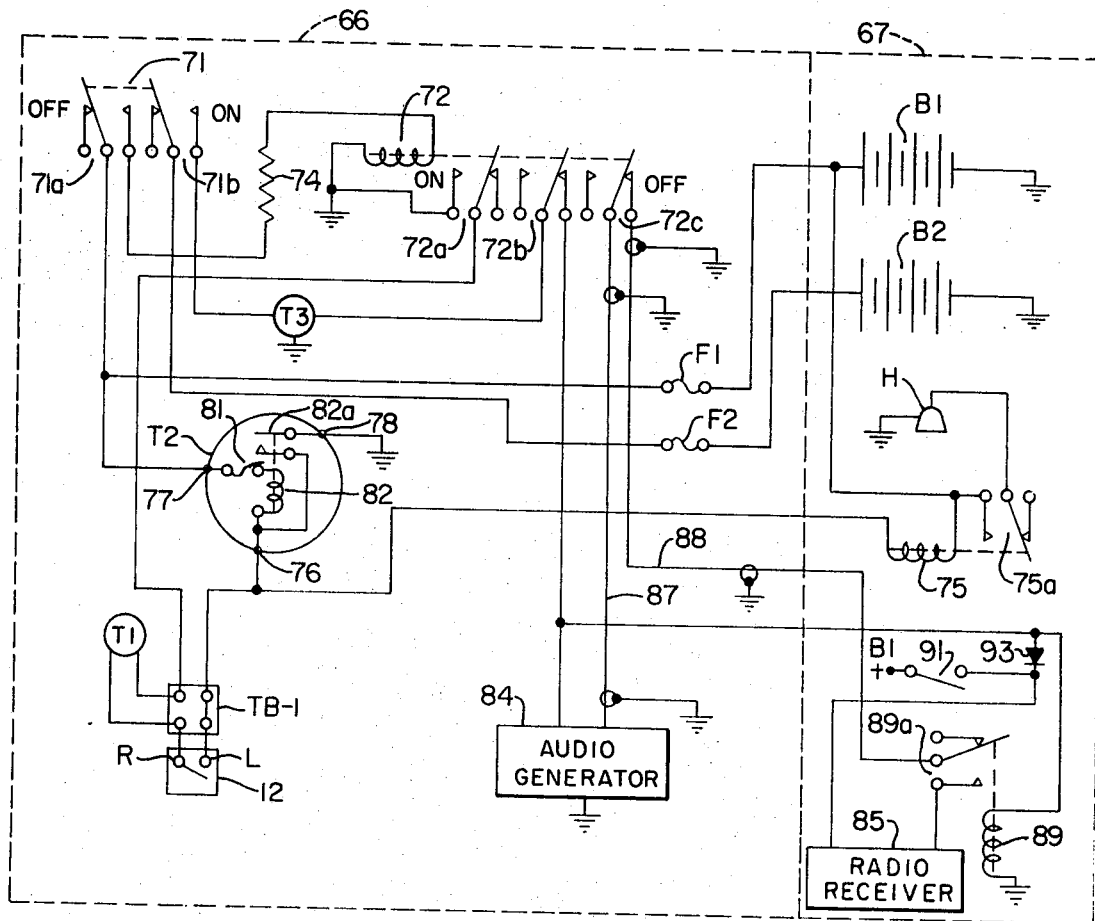
FIG. 6 is a schematic circuit diagram of a vehicle-mounted, self-contained alarm system usable with the detector shown in FIGS. 1-5.

Referring now to the drawings, the preferred form of alarm apparatus shown in FIGS. 1-5 is adapted for use with a motor vehicle and is broadly comprised of a detector 12 which extends downwardly from the lower end of an alarm housing 13 through a bottom opening 13a. The housing 13 is attachable to a motor vehicle by any suitable means such as a bracket on the housing, with fasteners or the like, not shown, so that the detector 12 will in effect be carried from the vehicle and respond to movement thereof.

Broadly stated, detector 12 is in the form of a normally-open, movement-responsive electric switch which is closed when the object on which it is mounted is moved, and detector 12 is connected into the circuit of an alarm system which selectively regulates power from a power source to an alarm element. The housing 13 preferably is arranged to contain alarm circuits, described hereinafter with reference to FIG. 6, which may for example be located on an upper shelf 14, and the housing 13 is of a tamper-proof construction with a hinged front door 15 to be locked to protect the detector 12 and the contained alarm circuits of the alarm system and yet provide ready access thereto.

The detector 12 shown comprises an elongated tubular housing or tube 17, an intermediate housing 18 surmounted on the tubular housing 17, and a mount portion 19 surmounted on the intermediate housing above the tubular housing 17. The detector 12 is arranged to be swingingly supported so that the tubular housing 17 and its contents at all times will be oriented along a vertical axis and maintain a vertical attitude independently of the inclination of the vehicle. To this end there is provided a mounting base 21 disposed on an intermediate shelf 22 centrally of the housing 13. Base 21 has a concave, generally semi-spherical upper support surface 23 and a radial slot 24 extending through its forward side which opens toward the access door 15 to facilitate easy removal and replacement of the detector 12 from housing 13. The mount portion 19 at the upper end of the detector 12 includes a generally spherical or rounded head 19a and a narrowed neck 19b which widens into a flat base plate 19c attaching to the top of the intermediate housing 18. Base plate 19c may be removably attached to the housing 18 using bolts or the like. The rounded surfaces of the mounting base 21 and the head portion 19 are complementary and slide freely against one another and are formed as smooth surface areas to reduce friction. To this end the surfaces of the head portion 19a may be an ultra-hard Teflon-coated plastic and the mounting base 21 Teflon-coated polished steel.

When the detector 12 is in an operative position on the mounting base the neck portion 19b is positioned in the slot 24 and the complementary rounded surfaces of head portion 19a and support surface 23 are in engagement with one another. The spherical head 19a is centered on the vertical axis of the tubular housing and the force of gravity will cause the tubular housing 17 to move to a vertical orientation since it is free to swing about its upper end. Additional weight in the form of solid shot or lead 26 is loaded into the bottom of the tubular housing 17 to insure the self-leveling thereof. As shown in FIG. 3 an inverted U-shaped partition 27 is nested in the bottom of the housing 17 and is fixedly secured thereto. The weight 26 is held in the U-shaped housing 27 by a closure plate 28 press-fitted in the open underside of partition 27, and a flanged removable cap 29 is threaded into the lower open end of the housing 27.

A clamp mechanism is provided to grip the tubular housing 17 and secure it against swinging movement when not in use. This clamp mechanism is comprised of a hinge 30 attached to the bottom wall of the housing 13 adjacent to and rearwardly of the tubular housing 17, and a lower vertical extension 31 of the hinge supports a pair of forwardly extending, spring-loaded arcuate gripping arms 32 and 33 yieldingly engaging opposite sides of the housing 17. Although not shown, the hinge is preferably spring-tensioned to automatically move the entrance away from the detector when the clamp arms are released and release the detector.

Within the tubular housing 17 there is suspended a solid, generally spherical contact member 35 preferably made of steel suspended from a conductive cable 36 centered in the tubular housing 17, and an outer concentric ring-like contact member 37 of a conductive material is also centered in the tubular housing concentric with and normally spaced from the suspended ball 35 when the suspended ball is elevated from the inactive position shown, as described hereinafter. The inner surface of the outer contact ring 37 is inclined outwardly and downwardly to provide an upwardly convergent circumferentially extending surface contact area, and a relatively narrow band or ring portion 38 extends upwardly from the central portion which inclines outwardly and upwardly to provide an upwardly divergent and circumferentially extending outer surface contact area which directly contacts ring 37. The suspended contact member 35 is in an operative position when its ring portion 38 is within ring 37 so that lateral movement of ring 38 produces a contact. The suspended contact member 35 is elevated to its operative position by moving shaft 14 inwardly from the position shown to elevate member 35 and in this position the opposed conductive surface contact areas defined by rings 37 and 38 are directly opposite one another in a relatively close proximity to form an annular air gap or space therebetween, making the detector sensitive to the movement of the vehicle in substantially any direction.

The cable 36 is suspended from the inner end of an actuator shaft 41. The mounting arrangement for the shaft is in the intermediate housing 18 and includes an inwardly directed tubular extension 42 arranged transversely of the top of the tubular housing 17 and through a side wall of housing 18. The upper end of the cable 36 extends through and is slidable in an outwardly and upwardly tapered aperture 43 in the inner end of the shaft 41 and then fixedly attaches at its upper end to an internal electric terminal 44 located in the bottom wall of the shaft housing 18. The raising and lowering of the suspended contact member 35 will then be carried out by movement of the shaft inwardly into the housing 18 away from the centered position shown in FIG. 3, during which cable 36 will slide in aperture 43. In the centered position the tapered aperture 43 is aligned with the axis or center of tubular housing 17. The range of horizontal movement for the shaft is from the outermost position shown to an innermost position over a range of movement represented at A and the corresponding range of vertical movement for the suspended contact member 35 is over a distance represented at B.

The movement of actuator shaft 45 inwardly into the housing is resisted by the spring-loading of shaft 45. This spring-loaded arrangement includes a tension spring 46 on the shaft within housing 18 which is held under tension between a washer 47 at the end of the shaft just inwardly of the shaft aperture 43 and the inner end of the tubular extension 42. To hold the shaft at one of a plurality of settings, the shaft is provided with a series of spaced notches 48 along its underside which releasably engage the top edge of a laterally projecting latching and release lever 49 which extends across to cover a lower portion of an aperture in a side plate 51 mounted on the side of the housing 18. The lever 49 may be resiliently urged upwardly against the shaft 41 by a pusher and compression spring, not shown. When the shaft is in the outermost position shown, the innermost notch relative to the inner end of the shaft engages the latching and release lever 49 and each succeeding notch toward the outer end of the shaft provides a preselected amount of inward positioning of the shaft, thereby resulting in elevating the suspended contact member 35 within the tubular housing 17 in a series of preselected steps.

To facilitate the centering of the cable 36 in the tubular housing 17 for all settings of the actuator shaft 41, the upper end of the cable extends vertically upwardly through a tubular guide 52 mounted in the bottom wall of the intermediate housing 18. The guide 52 has a cylindrical lower portion which terminates in an outwardly and upwardly diverging upper end section having a smooth rounded top edge which may for example be polished metal to maintain a free sliding movement of the cable in its vertical movement by shaft 41. In the outermost setting of the shaft, as shown, aperture 43 is located directly above the center of the guide 52, and the suspended contact member 35 is in its lowermost position where it rests on a carrier member 53 and at this position the cable 36 is taut. As the shaft 41 is advanced into the housing 18 the cable 36 will ride against guide 52 and elevate the suspended contact member 35 to gradually decrease the air gap between rings 37 and 38 so that the detector will be most sensitive at its highest setting and even a very slight movement of member 35 will tend to cause a contact between sections of the opposed surface areas in response to a movement of the vehicle. A sensitivity gauge 55 is mounted under the outer end of the shaft on the side of the housing 18 and has indicia 56 along each side of a central curved recess as best shown in FIG. 4 which will indicate the extent of movement of the shaft into the housing 18 and thereby the sensitivity setting of the detector. In addition, the shaft 41 is provided with a knob 57 for gripping by the user at its outer end and a circular stop inwardly of the knob 58.

The internal terminal 44 connected to the upper end of cable 39 connects to an external terminal designated R, mounted in the top of the mount portion 19, through a line or conductor 50. Conductor 50 passes upwardly through the top wall of the housing 18 and through the head portion 19a. A releasable connector may be provided between terminal 44 and line 50, as shown, to facilitate ready removal of the top of the housing 18. The outer contact ring 37 connects through vertical connecting bar 59 to an upper conductive ring 60 in the tubular housing above ring 37. A resilient contactor 61 is supported from the bottom wall of housing 18 and has a curved lower end portion held in engagement with the upper ring 60 to make an electric contact therewith and has its upper end connected to an internal terminal 62 on the bottom wall of the housing 18. As shown in FIG. 3 the tubular housing 17 threads into an opening in the bottom of housing 18. A line or conductor 63 connects between an internal terminal 62 and an external terminal L adjacent external terminal R in the head portion. Again a releasable connector may be used at the inner end of line 63 as shown to releasably connect it to terminal 62 to facilitate removal of the head portion 19 and top wall of housing 18.

Summarizing then, the circuit through the detector 12, beginning with external terminal R, is through line 50, internal terminal 44, cable 36, and ball-shaped contact member 35 including ring portion 38. With an outer surface area section of ring 38 contacting an inner surface section of outer ring 37 in response to a movement of member 35, the circuit is completed through the detector via contact ring 37, bar 59, ring 60, connector 61, internal terminal 62 and line 63 to the external terminal L. As shown in FIG. 1 the external terminals L and R are interconnected by conductors 64 and 65 to the alarm circuits and elements represented in dashed lines 66 which are shown as mounted in the upper portion of housing 13.

An alarm system herein referred to as the vehicle-mounted alarm system is represented as being contained in blocks 66 in the vehicle-mounted housing in FIG. 1 and is represented in a dashed line block 66 in the schematic diagram of FIG. 6. This alarm system includes a primary alarm circuit arranged to connect the power from the vehicle DC battery B1 to the vehicle horn H. The detector 12 described fully in FIGS. 1–5 is represented schematically in FIG. 6 as an electric switch with external terminals L and R being connected and disconnected by the movement of a movable contact arm. In this alarm circuit there is provided an on-off control switch 71 preferably mounted in housing 13 having contacts 71a controlling the power from the vehicle battery B1 to the coil of a hold relay 72 via a fuse F1 and a current limiting resistor 73. Hold relay 72 has three sets of contacts represented at 72a, 72b and 72c. Each set of the contacts of relay 72, as well as those of the relays hereinafter described, has an associated third contact shown which is a dummy contact for engaging the movable contact arm when it is moved to the OFF position but each set of contacts herein referred to are those which come together to complete and separate to interrupt the circuit in which they are connected.

A vehicle horn relay 75 has normally-open contacts 75a which when closed connect the battery B1 directly to the horn H upon the energization of relay 75. One side of the coil of relay 75 is connected to the battery B1 and the other side of the coil to a first grounding circuit which includes terminal block TB-1, the detector 12, a delay-on timer T1 and contacts 72a, to ground. Once the on-off control switch 71 is in the ON position and after the delay-on timer T1 has run, the closure of the contacts in the detector 12 functions to complete the first grounding circuit for the coil of relay 75 and this in turn closes contacts 75a to actuate the horn H. TImer T1 is preferably mechanically set and has an on-delay, adjustable from 0 to 5 minutes, to prevent activation of the system until after the driver has set the detector and control circuits and left the vehicle.

A second grounding circuit for the coil of the relay 75 includes a hold-on timer T2 having three terminals 76, 77 and 78. Terminal 76 is connected to the ground side of the coil of relay 75. Terminal 77 connects to the battery B1 via fuse F1 and terminal 78 is connected to ground. The hold-on timer T2 shown has a thermal-operated automatic resetting time-on switch 81 with a relay 82. The coil of relay 82 is connected between terminals 76 and 77 via switch 81 with the normally-open contacts 82a of the relay 82 being connected between terminals 76 and 78. With this arrangement, when the detector 12 is actuated, the coil of relay 75 is momentarily grounded by the first grounding circuit. The coil of relay 82 is simultaneously energized with the initial energization of relay 75 to hold the ground for relay 75 for a predetermined time interval, such as, for 3 to 5 seconds via terminals 76 and 78. After this interval thermal switch 81 opens to de-energize relay 82 to remove ground for the coil of relay 82 and stop the horn. The horn sounding will start again for the same interval for each subsequent actuating movement of the detector.

A secondary or auxiliary alarm system, a portion of which is also included in housing 13, takes over if the vehicle battery B1 fails or is disconnected. This system is powered by an auxiliary hot-shot type battery B2 carried preferably in the trunk of the vehicle which, broadly stated, provides a control signal to actuate an audio signal generator 84 and a broadcast radio receiver 85 and connects the output of the signal generator 84 to the input of an audio amplifier stage of a vehicle broadcast radio receiver 85.

The audio generator 84 is preferably a conventional solid-state, DC powered unit operating at audio frequencies. A police siren or any combination of tones are generated by generator 84 and these tones are amplified in the broadcast receiver 85 and reproduced as audible sound through the radio speaker in the broadcast radio receiver 85 to alert someone as to the unauthorized use of the vehicle. When the secondary alarm system takes over, the coil of hold relay 72 is de-energized with its contacts returning to the OFF position shown. This also mutes the detector 12 since one side of its circuit is completed to ground via contacts 72a. The power from the secondary battery B2 is applied through a fuse F2 and contacts 71b to the input side of an on-hold, timer T3 and from there through the relay contacts 72b to the input of the audio generator 84. Timer T3 is settable to maintain the power for a predetermined period, as for example 0 to 10 minutes, and then the auxiliary power from battery B2 to the generator 84 and other load devices hereinafter described is interrupted.

The output of the audio generator 84 is applied through a shielded conductor 87, through contacts 72c, through shielded conductor 88 and through the contacts 89a of an input relay 89 into the broadcast radio receiver 85. The power from the auxiliary battery B2, through closed contacts 72b, is also applied through diode 93 to the input of the broadcast radio receiver 85 and to the coil of relay 89 so that they thereby are simultaneously energized when the energization of the audio generator 84 takes place. The blocking diode 93 is connected between the input of the broadcast radio receiver 85 and the relay coil 89 so that the broadcast radio receiver 85 is turned on for normal operation by power from primary battery B1 indicated at a terminal + which is applied to the receiver 85 through the regular broadcast radio on-off switch 91. With this arrangement relay 89 would not be energized during the normal operation of the radio receiver 85 until such time as the primary battery B1 fails and the secondary alarm system takes effect.

The operation of the detector 12 and the vehicle-mounted control system shown in FIG. 6 will now be summarized. Upon leaving the vehicle the clamp arms 32 and 33 are released and the sensitivity of detector 12 is set by moving the actuator shaft 41 into the housing to elevate the ball-shaped contact member 35 into the operative position. The delay-on timer T1 is set to allow sufficient time for the driver to get out of the vehicle without triggering the alarm and control switch 71 is turned to the ON position. The door 15 is then closed and locked. Once timer T1 has run, movement of the vehicle will bring the contact member in the detector together thereby completing the grounding circuit for relay 75 which causes it to turn on. Timer T2 holds the horn H on for a predetermined interval by providing a secondary ground for relay 75 after the primary ground via detector 12 opens. This sequence repeats as long as the vehicle movement continues since there will be repeated engagements between the contact members in the detector 12.

In the event that this primary alarm system is rendered ineffective, such as if the vehicle battery is disconnected, the hold relay 72 turns to the OFF position and triggers the secondary alarm system. The auxiliary battery B2 is then connected via timer T3 to turn the audio generator and broadcast radio receiver on. The timer T3 holds this alarm circuit in operation for a predetermined period and then opens this circuit to shut off the alarm.

Figure 7:
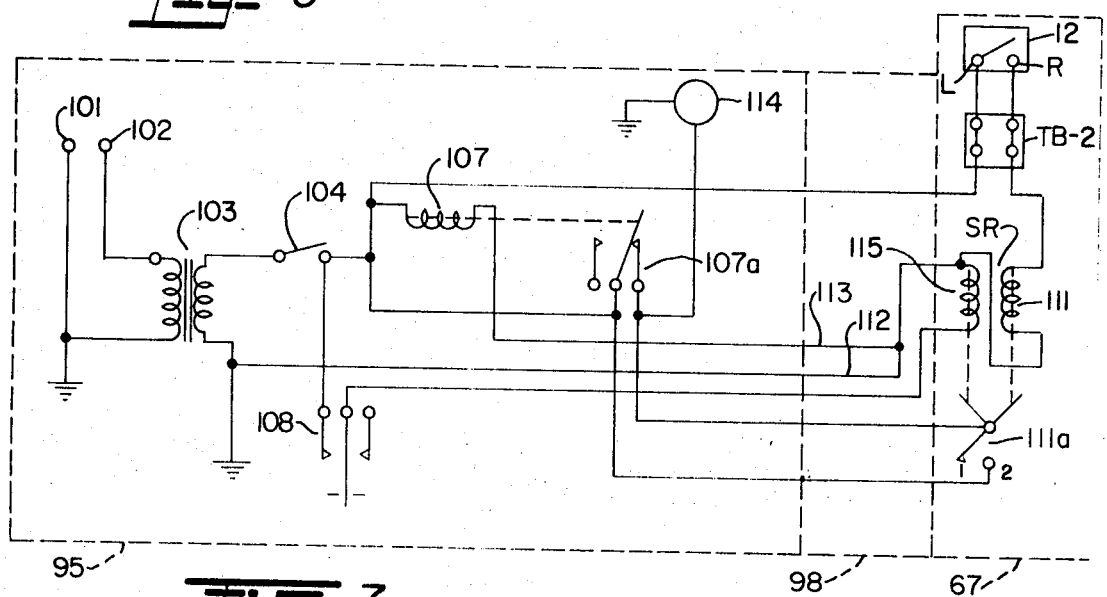
FIG. 7 is a schematic circuit diagram of a remotely located alarm system usable with the detector shown in FIGS. 1-5.

A extra-vehicular alarm system adapted to be located remote from the vehicle and actuated by the detector 12 on the vehicle is shown in FIG. 7 and is enclosed in a dashed line block at 95. The detector 12, a terminal block TB-2 and a solenoid relay switch SR are located on the vehicle represented in dashed lines again at 67. The remotely located alarm circuits 95 are connected by cables comprised of a plurality of lines between circuits 95 and the vehicle 67 represented in dashed lines at 98. This remote alarm system may use available house power (110-volt AC power) which is applied to input terminals 101 and 102.

The AC power supplied to input terminals 101 and 102 is stepped down by a transformer 103. An on-off power control switch 104 is connected to the secondary winding of the transformer 103 to regulate the power to the alarm element and control circuits. The control switch 104 connects to one side of the detector 12 via terminal block TB-2, to one side of the coil of relay 107, to one of the set of contacts 111a of a solenoid relay switch SR, to one of the set of contacts 107a of relay 107 and to one of the set of contacts of a momentary detent, reset switch 108. The other side of the detector 12 returns through one coil 111 of the solenoid relay switch SR and back to ground through line 113 of the cable 98. The other contact of set 107a connects to the alarm element 114 which may be a bell or buzzer. The other contact of set 111a also connects to the alarm buzzer 114 and the other of the set of contacts of switch 108 connects to the ungrounded side of the other coil 115 of switch SR.

In the operation of the remote alarm system, when power switch 104 is closed in the home and the detector contacts close in the vehicle 67, coil 111 is momentarily energized causing closure of contacts 111a to apply the power from the transformer to the alarm bell or buzzer 114. Contacts 111a remain closed upon the momentary energization via the detector until the second winding 115 is energized. A depression of reset switch 108 causes contacts 111a to return to the open position to stop the alarm buzzer 114. The hold relay 107 remains energized while the system is on and if the coil circuit of relay 107 opens, which could result by cutting or disconnecting or severing the cable 98, then the buzzer or bell 114 is actuated via contacts 107a and remains on until switch 104 is turned off. This feature provides additional alarm versatility for the surveillance of vehicles near the home and operates independently of the detector 12.

Although the present invention has been described with a certain degree of particularity, it is understood that the present disclosure has been made by way of example and that changes in details of structure may be made without departing from the spirit thereof.

What is claimed is:

1. Anti-theft detector apparatus for use on a motor vehicle to actuate an alarm element in an alarm circuit, said detector apparatus comprising
   a mounting base secured to the vehicle having an upper rounded support surface and a radially extending slot,
   a tubular housing having a mount portion in its upper end including a narrowed neck portion positioned in said slot and terminating at its upper end in an enlarged head portion seated on said upper rounded support surface for swingingly supporting said tubular housing from said base so that the tubular housing maintains a vertical attitude independently of the inclination of the vehicle,
   a generally spherical contact member suspended from a cable for free swinging movement in the housing and electrically connnected to an external terminal mounted on said head portion, said external terminal being connected in said alarm circuit, and
   a ring-like contact member concentric with and normally spaced from the suspended contact member and electrically connected to a second terminal on said head portion, said second terminal connecting in said alarm circuit, whereby a movement of the vehicle causes the suspended contact member to move in a pendulum action into engagement with said ring-like contact member to short-circuit said first and second terminals and thereby complete said alarm circuit to said alarm element.

2. Anti-theft detector apparatus as set forth in claim 1 wherein said mounting base is enclosed in a vehicle-mounted housing having a bottom opening through which a portion of said tubular housing extends.

3. Anti-theft detector apparatus as set forth in claim 1 including a releasable clamp secured on said vehicle-mounted housing to rigidly secure the tubular housing against swinging movement when not in use.

4. An anti-theft detector for use on motor vehicles to actuate an alarm element in an alarm circuit, said detector comprising
   a housing swingingly supported from the vehicle so as to maintain a vertical attitude independently of the inclination of the vehicle,
   a pair of contact members within the housing and connected in the alarm circuit, said contact members being spaced apart and movable into contact with one another, one of said contact members being suspended for free swinging movement whereby a movement of the vehicle causes the contact members to contact one another to complete the alarm circuit, and an actuator shaft extending above and transversely of the top of the elongated housing from which said suspended contact member is supported for a free swinging movement in said elongated housing, said actuator shaft being adjustable laterally of the upper end of said elongated housing to move said suspended contact member to a selected elevation in said housing.

5. An anti-theft detector for use on motor vehicles to actuate an alarm element in an alarm circuit, said detector comprising
   a housing swingingly supported from the vehicle so as to maintain a vertical attitude independently of the inclination of the vehicle,
   a pair of contact members within the housing and connected in the alarm circuit, said contact members being spaced apart and movable into contact with one another, one of said contact members being suspended for free swinging movement whereby a movement of the vehicle causes the contact members to contact one another to complete the alarm circuit, and an actuator shaft extending above and transversely of the top of the elongated housing from which said suspended contact member is supported for a free swinging movement in said elongated housing, said actuator shaft being adjustable laterally of the upper end of said elongated housing to move said suspended contact member to a selected elevation in said housing, said suspended contact member being generally spherical in shape and having a ring-shaped section around its center, the outer contact surface area of said ring-shaped section inclining outwardly and downwardly and the inner associated contact surface area of the other contact member inclining outwardly and upwardly to decrease the air space therebetween as said suspended contact member is elevated.

6. Anti-theft alarm apparatus for use on a motor vehicle to actuate an alarm element comprising
   a detector on the vehicle having a set of normally open contact members adapted to momentarily close when the vehicle is moved, and
   an alarm circuit including means responsive to a momentary engagement of said contact members to actuate said alarm element for a predetermined time interval each time said contact members are closed, said vehicle having a DC battery and a horn, said horn serving as the alarm element and being actuated from said vehicle battery, and
   a secondary alarm circuit triggered by the disconnecting of said vehicle battery, said secondary alarm circuit including an auxiliary battery arranged for connecting the power from said auxiliary battery to an audio generator having its output coupled to the input of a radio broadcast receiver.

* * * * *